(12) United States Patent
Heitzenrater

(10) Patent No.: US 10,539,194 B2
(45) Date of Patent: Jan. 21, 2020

(54) TRANSMISSION ASSEMBLY HAVING DAMPENING MATERIAL

(71) Applicant: GM GLOBAL TECHNOLOGY OPERATIONS LLC, Detroit, MI (US)

(72) Inventor: Scott W. Heitzenrater, Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 634 days.

(21) Appl. No.: 15/220,444

(22) Filed: Jul. 27, 2016

(65) Prior Publication Data

US 2018/0031049 A1 Feb. 1, 2018

(51) Int. Cl.
| | |
|---|---|
| *F16D 13/64* | (2006.01) |
| *F16F 9/30* | (2006.01) |
| *F16D 13/68* | (2006.01) |
| *F16D 25/0638* | (2006.01) |
| *F16D 25/10* | (2006.01) |

(Continued)

(52) U.S. Cl.
CPC ........... *F16D 13/648* (2013.01); *F16D 13/52* (2013.01); *F16D 13/58* (2013.01); *F16D 13/683* (2013.01); *F16D 25/0638* (2013.01); *F16D 25/10* (2013.01); *F16F 9/306* (2013.01); *F16F 15/10* (2013.01); *F16H 55/17* (2013.01); *F16D 2300/22* (2013.01); *F16H 2055/176* (2013.01); *F16H 2055/178* (2013.01)

(58) Field of Classification Search
CPC .......... F16D 13/52; F16D 13/58; F16D 13/60; F16D 13/648; F16D 13/683; F16D 25/0638; F16D 25/10; F16D 25/123; F16D 2300/22; F16H 55/17; F16H 2055/176; F16H 2055/178; F16H 57/028; F16H 57/023; F16F 9/306; F16F 15/10
See application file for complete search history.

(56) References Cited

U.S. PATENT DOCUMENTS

| | | | | |
|---|---|---|---|---|
| 1,803,077 A | * | 4/1931 | Spase | ........................ F16D 7/02 |
| | | | | 192/209 |
| 3,245,508 A | * | 4/1966 | Livezy | .................... F16D 13/52 |
| | | | | 188/268 |

(Continued)

FOREIGN PATENT DOCUMENTS

| | | |
|---|---|---|
| EP | 0 901 580 B1 | 3/2005 |
| JP | 2007154919 A | 6/2007 |

OTHER PUBLICATIONS

Material Sciences Corporation, "Quiet Steel: Quiet Steel Sets a New Standard in Low-Mass, Low-Cost, High Performance Sounds Dampening Steel," pp. 1-5, printed on May 25, 2016, available at www.materialsciencescorp.com/products/quiet-steel.

(Continued)

*Primary Examiner* — Richard M Lorence (57) ABSTRACT

A motor vehicle transmission assembly is provided that includes a dampening component configured to reduce at least one of noise and vibration within the transmission assembly. In some versions, the dampening component is disposed between first and second transmission components, and the dampening component may be fixed to and/or abutting one of the transmission components. The dampening component may comprise a dampening layer disposed between a pair of outer layers. In some versions, the dampening component has a metallic portion and a non-metallic portion.

18 Claims, 10 Drawing Sheets

(51) Int. Cl.
*F16D 13/52* (2006.01)
*F16D 13/58* (2006.01)
*F16F 15/10* (2006.01)
*F16H 55/17* (2006.01)

(56) References Cited

U.S. PATENT DOCUMENTS

| | | | |
|---|---|---|---|
| 5,063,098 A * | 11/1991 | Niwa | B32B 15/06 |
| | | | 428/76 |
| 5,467,664 A | 11/1995 | Wehner | |
| 5,788,035 A * | 8/1998 | Avers | F16D 13/648 |
| | | | 192/107 C |
| 6,202,462 B1 | 3/2001 | Hansen | |
| 7,244,185 B2 | 7/2007 | Kamdem | |
| 7,401,690 B2 | 7/2008 | Lazowski | |
| 7,509,935 B2 | 3/2009 | Vincer | |
| 7,927,219 B2 | 4/2011 | Saeki | |
| 8,052,560 B2 | 11/2011 | Nosaka | |
| 8,216,107 B2 | 7/2012 | Tao | |
| 9,233,526 B2 | 1/2016 | Vansweden | |
| 2006/0137944 A1 | 6/2006 | Denys | |
| 2008/0248274 A1 | 10/2008 | Hierholz | |
| 2011/0287846 A1 | 11/2011 | Drechsler | |
| 2013/0008274 A1 | 1/2013 | Mori | |
| 2015/0159707 A1 * | 6/2015 | Boelling | F16F 15/124 |
| | | | 192/45.003 |
| 2016/0160944 A1 | 9/2016 | Arbesman | |

OTHER PUBLICATIONS

Material Sciences Corporation, "Quiet Aluminum: A Lightweight Dampening Alternative to Aluminum panels that require mass intensive NVH treatments." pp. 1-5, printed on May 25, 2016, available at www.materialsciencescorp.com/products/quiet-aluminum.

* cited by examiner

TRANSMISSION ASSEMBLY HAVING DAMPENING MATERIAL

FIELD

The present disclosure relates to motor vehicle transmission assemblies, and more particularly, to transmission assemblies that create noise through engagement and/or disengagement of torque transmitting mechanisms and/or through gear assemblies.

BACKGROUND

The statements in this section merely provide background information related to the present disclosure and may or may not constitute prior art.

Many automatic motor vehicle transmissions include a plurality of gear arrangements, interconnecting members, shafts, and torque transmitting mechanisms, among other mechanical members. The various torque transmitting mechanisms are employed to selectively transmit torque from one rotating member to another or from a rotating member to a stationary member. Typical examples of torque transmitting mechanisms may include synchronizers, dog clutches, and multiple friction disc clutches and brakes. A multiple disc clutch or brake, for example, may be used to connect a member of a planetary gear set such as a ring gear with the transmission housing, thus changing the output of that particular planetary gear set.

Such torque transmitting mechanisms can make clacking noises or other noises because they are often used to connect or disconnect transmission gears, shafts, or other parts that are rotating at different speeds or to connect a part that is rotating with a stationary part. For example, clutch plate teeth can vibrate within a spline of an inner hub or an outer housing and make corresponding noises. Such noises were traditionally masked by the sounds created by an internal combustion engine. However, when an electric motor is being used in a hybrid or electric vehicle, noises from the motor vehicle powertrain, such as from torque transmitting mechanisms, gear, or clutch plates, become easier to hear. These noises are often deemed undesirable from a customer's point-of-view.

One way to reduce noise from within the vehicle powertrain is to form the components from cast iron. Cast iron is known for having a relatively high damping capacity; however, cast iron components are heavy, and the general trend in automotive technology is to lighten vehicle components to achieve greater fuel economy. In addition, cast iron may have other drawbacks, such as potential for cracking. Polymers are another material having a high damping capacity; however, polymers are typically not strong enough to carry the torque loads transmitted through a vehicle powertrain, and in addition, they may not withstand the harsh fluids, heat, and other environmental factors within a vehicle powertrain.

Accordingly, there exists a need to dampen sounds created by a motor vehicle transmission, while continuing to strive toward the goal of creating light-weight and fuel-efficient vehicles that are amenable to large-scale manufacturing.

SUMMARY

The present disclosure provides a dampening component within the transmission assembly that is configured to absorb undesirable noises caused by the clutch plates or other transmission components. The dampening component may utilize a plurality of materials to provide for robustness of torque transmission, while providing sound dampening qualities and having light weight. In some versions, the dampening component comprises a polymer disposed between a pair of metal (e.g., aluminum or steel) layers.

In one example, which may be combined with or separate from other examples provided herein, a motor vehicle transmission assembly is provided that includes first and second transmission components and a dampening component. The second transmission component can be a clutch hub, a clutch housing, a gear, a case, a support, or a shaft. The dampening component is disposed between the first and second transmission components. The dampening component is configured to reduce noise and/or vibration within the transmission assembly. The transmission assembly is configured to transfer torque between the first and second transmission components through the dampening component. The dampening component may abut the second transmission component, be fixed to the second transmission component, or both. The dampening component comprises a metallic portion and a non-metallic portion.

In another example, which may be combined with or separate from the other examples provided herein, a torque transmitting assembly for use in an automotive transmission is provided. The torque transmitting assembly includes a plurality of interleaved clutch plates configured to selectively transfer torque and a dampening component detached from the plurality of interleaved clutch plates. The dampening component is configured to reduce at least one of noise and vibration within the torque transmitting assembly created by the plurality of interleaved clutch plates. The dampening component comprises a dampening layer disposed between a pair of outer layers.

In yet another example, which may be combined with or separate from the other examples provided herein, a motor vehicle transmission assembly is provided that includes first and second transmission components, a plurality of interleaved clutch plates, and a dampening component. The second transmission component may be a clutch hub, a clutch housing, a gear, a case, a support, or a shaft. The plurality of interleaved clutch plates is configured to selectively transfer torque within the transmission assembly. The dampening component is disposed between the first and second transmission components, and the dampening component is configured to reduce noise and/or vibration created by the plurality of interleaved clutch plates. The dampening component may abut the second transmission component, be fixed to the second transmission component, or both. The dampening component comprises a metallic portion and a non-metallic portion.

Additional features may be provided, including but not limited to the following: the dampening component comprising a pair of metal layers; a polymer being disposed between the pair of metal layers; each metal layer comprising aluminum and/or steel; the first and second transmission components being substantially formed of aluminum and/or steel; the transmission assembly further comprising a plurality of interleaved clutch plates configured to selectively transfer torque within the transmission assembly; the dampening component being configured to reduce noise created by the plurality of interleaved clutch plates; the dampening component being a stamped insert abutting and sandwiched between the first and second transmission components; the first transmission component comprising a plurality of first splines; the second transmission component comprising a plurality of second splines; the pluralities of first and second splines being complimentary and configured to mate with each other and transfer torque therethrough; the dampening component being disposed between the pluralities of first and second splines; the first transmission component being a ring gear and the second transmission component being a clutch hub; a portion of the interleaved clutch plates being splined to the clutch hub; the first transmission component being a clutch plate having a plurality of teeth extending therefrom; the second transmission component forming a plurality of torque splines configured to receive the plurality of teeth of the clutch plate; the dampening component being an insert disposed in a torque spline of the plurality of torque splines; the dampening component being a first dampening component, the assembly further comprising a plurality of additional dampening components, each additional dampening component being disposed in a torque spline of the plurality of torque splines; the dampening component being a clutch hub or a clutch housing; the second component being a transmission case; the dampening component being coupled to the transmission case; the dampening layer comprising a polymer; the pair of outer layers being formed of metal; the dampening component being configured to transfer torque; the torque transmitting assembly further comprising a first transmission component and a second transmission component; the dampening component being configured to transfer torque between the first and second transmission components; and the torque transmitting assembly further comprising a member defining a plurality of torque splines configured to receive the plurality of teeth of the clutch plate.

Further aspects, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

With reference to FIG. 1, a portion of a motor vehicle automatic transmission is illustrated and generally designated by the reference number 10. The automatic transmission 10 includes a metal housing 12 which mounts, positions and protects various components such as an input or drive shaft 16, a plurality of planetary gear assemblies 18A, 18B, and various other components.

Figure 1A:
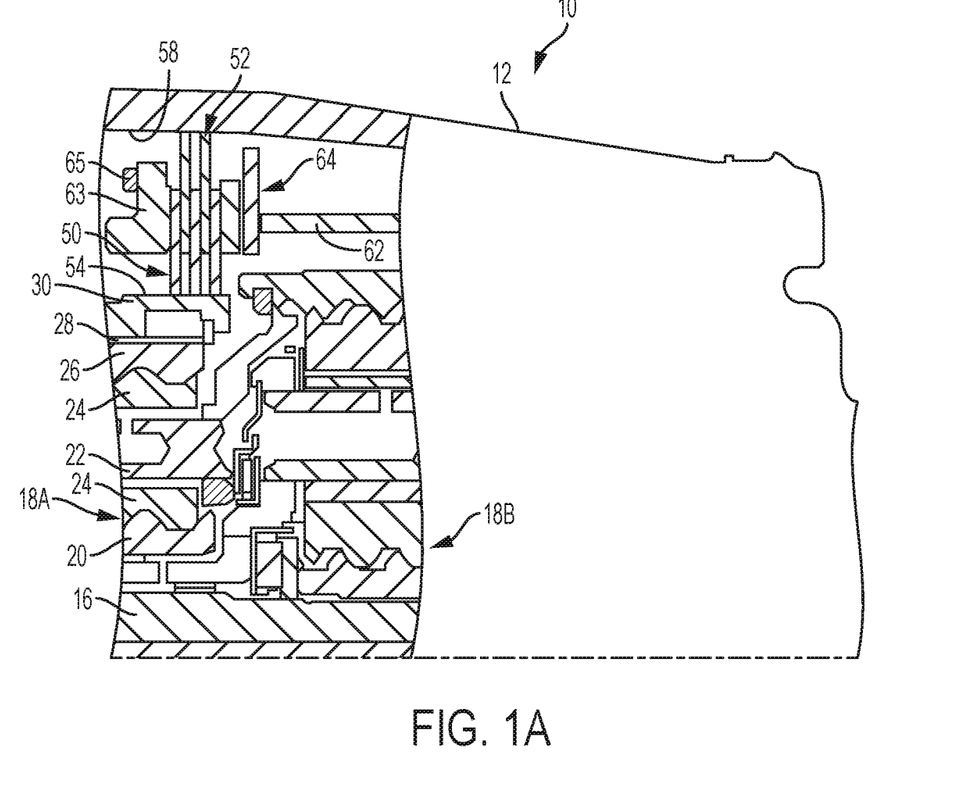
FIG. 1A is a cut-away cross-sectional view of a portion of a motor vehicle transmission assembly, including a dampening component, in accordance with the principles of the present disclosure.

In this example, one such planetary gear assembly 18A includes a sun gear 20, a planetary gear carrier 22 including a plurality, typically three or four, of planetary gears 24, and a ring gear 26. The sun gear 20 meshes with the planetary gears 24 that are concentrically disposed about the sun gear 20, and the planetary gears 24 mesh with the ring gear 26 that is concentrically disposed about the planetary gears 24 and the sun gear 20. Each of the sun gear 20, the planetary carrier 22, and the ring gear 26 may be selectively or fixedly connected to other gears, carriers, or stationary components within the transmission assembly 10 to transfer torque therethrough. A dampening component 28 and a clutch hub 30 are concentrically disposed about the ring gear 26.

Figure 1B:
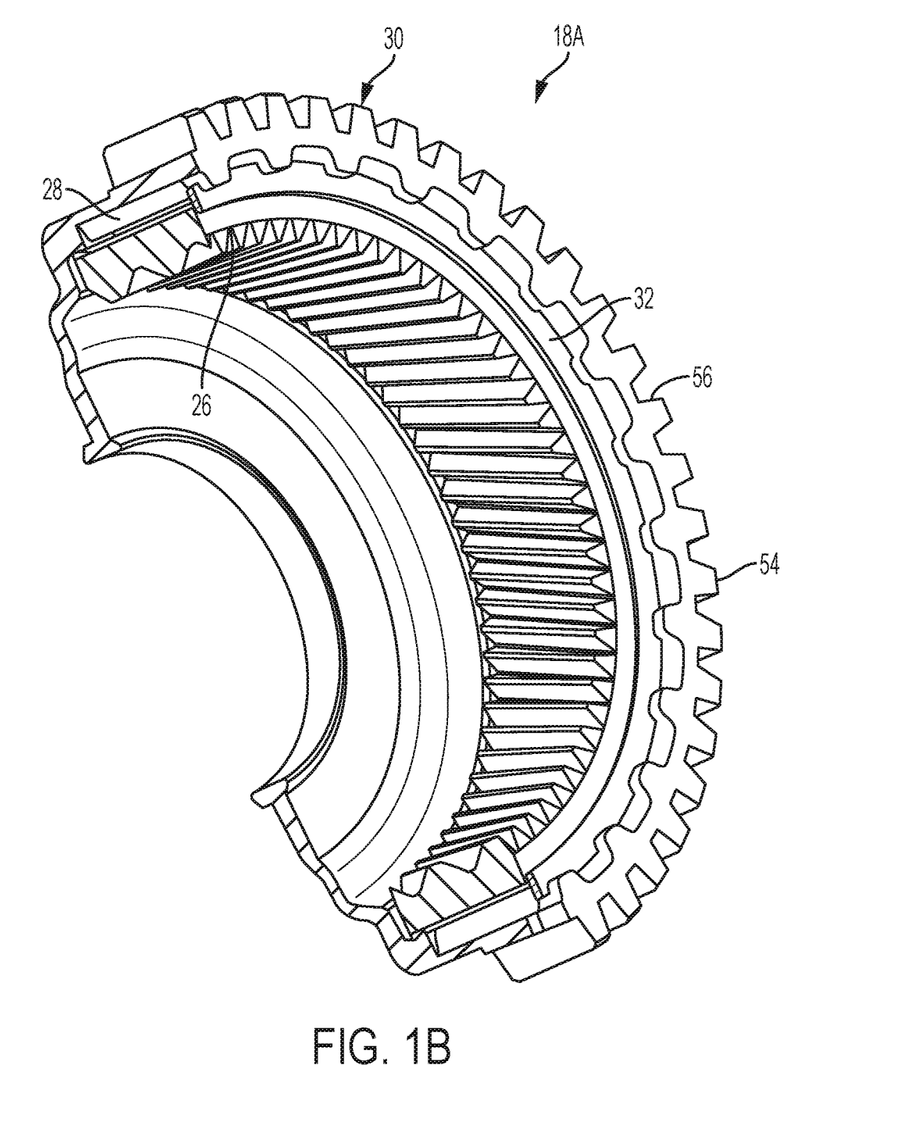
FIG. 1B is a cut-away perspective of a portion of the transmission assembly of FIG. 1A, including the dampening component, according to the principles of the present disclosure.
Figure 1C:
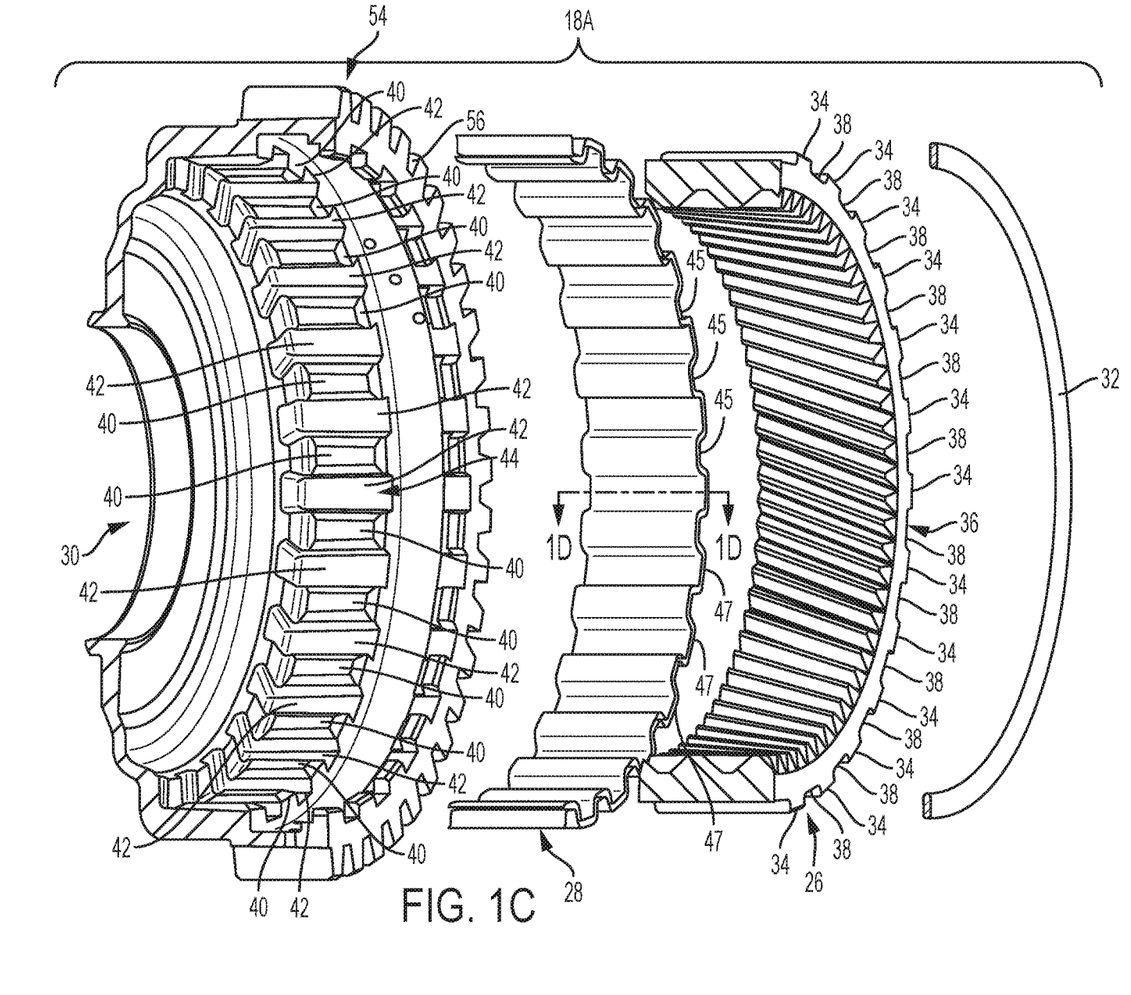
FIG. 1C is a cut-away exploded view of a portion of the transmission assembly of FIGS. 1A-1B, including the dampening component, according to the principles of the present disclosure.

FIGS. 1B and 1C illustrate assembled and exploded views, respectively, of the planetary gear assembly 18A including the clutch hub 30, the dampening component 28, the ring gear 26, and a snap ring 32. The planetary carrier 22, planetary gears 24, and sun gear 20 have been eliminated from these views for purposes of clarity in showing the remaining components. When the planetary gear assembly 18A is assembled, the snap ring 32 holds the ring gear 26 in place axially with respect to the clutch hub 30.

In the illustrated example, as seen in FIG. 1C, the ring gear 26 has a plurality of spline teeth 34 extending from an outer side 36 of the ring gear 26, and the spline teeth 34 are separated by a plurality of recesses 38. The clutch hub 30 has a plurality of corresponding spline teeth 40 and recesses 42 that are configured to mate with the spline teeth 34 and recesses 38 of the ring gear 26, in order to rotationally lock together the ring gear 26 and the clutch hub 30. The spline teeth 40 and recesses 42 of the clutch hub 30 are formed on an inner surface 44 of the clutch hub 30. Each recess 42 of the clutch hub 30 is configured to receive a spline tooth 34 of the ring gear 26, and each recess 38 of the ring gear 26 is configured to receive a spline tooth 40 of the clutch hub 30.

The dampening component 28 is disposed between the clutch hub 30 and the ring gear 26. In this example, the dampening component is a stamped insert that is sandwiched between the spline teeth 34, 40 of the clutch hub 30 and the ring gear 26 so that the dampening component abuts both the outer surface 36 of the ring gear 26 and the inner surface 44 of the clutch hub 30. Thus, the dampening component 28 has opposed protruding portions 45, 47 that are disposed in the recesses 38, 42 of the ring gear 26 and the clutch hub 30, respectively. Therefore, the dampening component 28 mates with the splines of the both the ring gear 26 and the clutch hub 30, in this example.

As the clutch hub 30 and the ring gear 26 are rotationally interlocked, torque is transferred therebetween. The dampening component 28 is thus also able to transfer torque between the ring gear 26 and the clutch hub 30. In other words, the transmission assembly 10 is configured to transfer torque between the ring gear 26 and the clutch hub 30 through the dampening component 28.

Figure 1D:
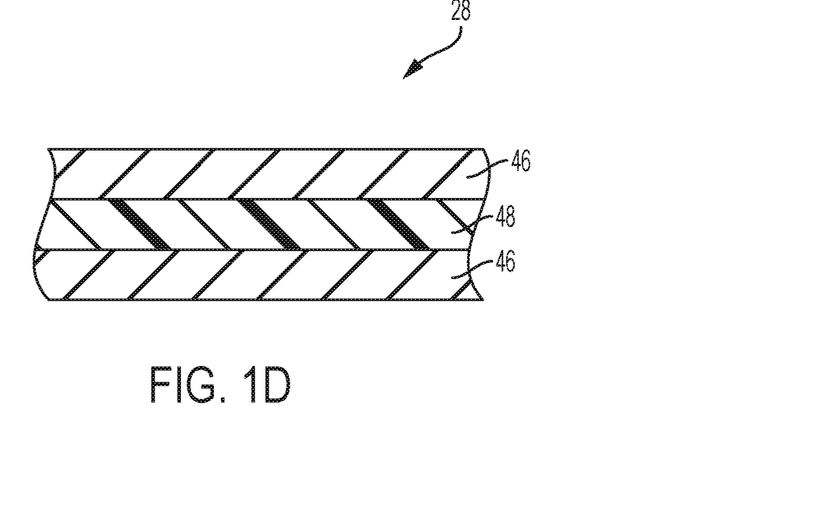
FIG. 1D is a cross-sectional view of the dampening component shown in FIGS. 1A-1C, taken along the lines 1D-1D in FIG. 1C, in accordance with the principles of the present disclosure.
Figure 1E:
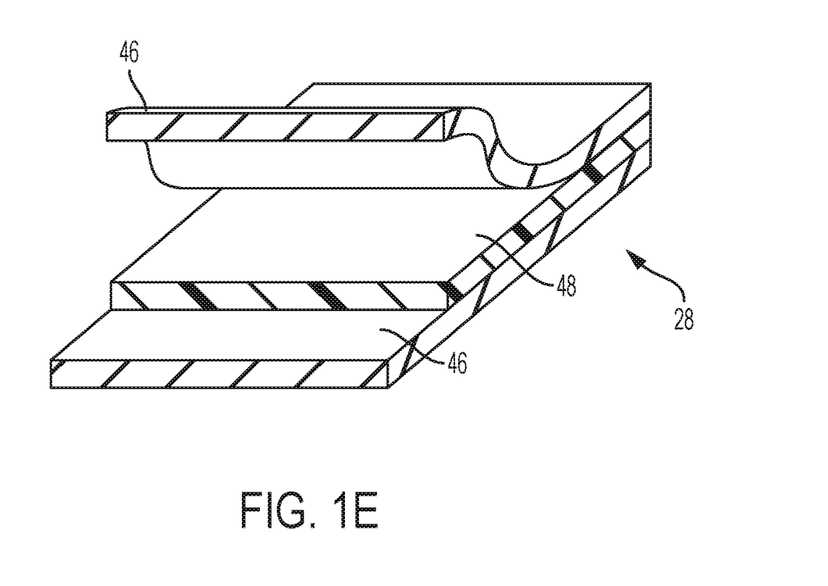
FIG. 1E is a schematic perspective pulled-back view of a portion of the dampening component shown in FIGS. 1A-1D, according to the principles of the present disclosure.

The dampening component 28 could have any configuration and arrangement that is sufficient to reduce at least one of noise and vibration with the transmission assembly 10. Referring now to FIGS. 1D and 1E, one example of a cross-section of the dampening component 28 is illustrated. The dampening component 28 includes a metallic portion and a non-metallic portion in this example. For example, the dampening component 28 comprises a pair of metal layers 46 and a polymer 48 disposed between the pair of metal layers 46. For example, the polymer 48 may be a viscoelastic polymer core having a pair of metal skins 46 attached thereto such that the polymer 48 is encased within the metal skins 46. In some examples, the polymer 48 is completely encapsulated within the metal skins 46, such that none of the polymer 48 is exposed. The metal skins 46 may be formed of sheet metal, by way of example.

The metal skins 46 may comprise any desirable metal, such as aluminum or steel. Thus, the dampening component 28 comprises a dampening layer 48 disposed between a pair of outer layers 46, in this example. Examples of dampening materials that may be used in the dampening component 28 are layered metal and polymeric materials sold under the registered trademarks Quiet Steel® and Quiet Aluminum® by Material Sciences Corporation.

Referring back to FIG. 1A, the motor vehicle transmission assembly 10 further comprises a plurality of interleaved clutch plates 50, 52 configured to selectively transfer torque within the transmission assembly 10. In this example, a set of first clutch plates 50 of the plurality of interleaved clutch plates 50, 52 are splined to an outer side 54 of the clutch hub 30 via spline teeth 56. A set of second clutch plates 52 of the plurality of interleaved clutch plates 50, 52 are splined to an inner side 58 of the transmission case 12, or to any other desirable component. The clutch plates 50, 52 are interleaved such that each clutch plate 50 of the first set is disposed adjacent to a clutch plate 52 of the second set.

The clutch plates 50, 52 may be friction clutch plates that are selectively engaged by a piston 62 or other actuator that is configured to compress the first and second sets 50, 52 of clutch plates together against a backing plate 63 through one or more apply plates 64. For example, friction facing material may be disposed on opposing faces of the clutch plates 50, 52. When compressed together, the clutch plates 50, 52 transfer torque between the clutch hub 30 and the case 12, by way of example. The clutch assembly may be retained together by a snap ring 65, by way of example. In the alternative, other types of clutches and/or brakes such as drums or dog clutches could be used. Thus, the plurality of interleaved clutch plates 50, 52 are configured to selectively transfer torque within the transmission assembly 10.

The dampening component 28 is configured to reduce noise and/or vibration created by any of the various gears 20, 24, 26 in the planetary gear assemblies 18A, 18B, the plurality of interleaved clutch plates 50, 52, or any other component within the transmission assembly 10. Thus, transmission components can be formed of materials that are traditionally not considered to be a sound dampening material, such as aluminum or steel. For example, the ring gear 26 and clutch hub 30 could be formed of steel or aluminum that may result in noise, but the dampening component 28 could absorb such noise. Cast iron, therefore, need not be used for its sound dampening qualities; however, in some examples, some transmission components are still formed from cast iron even with the addition of the dampening component 28.

In addition, splines in hubs, housings, and shafts can be created through stamping, rather than casting, if steel or aluminum are used to make the hubs, housings, or shafts, which may result in the splines being easier to create.

Figure 2A:
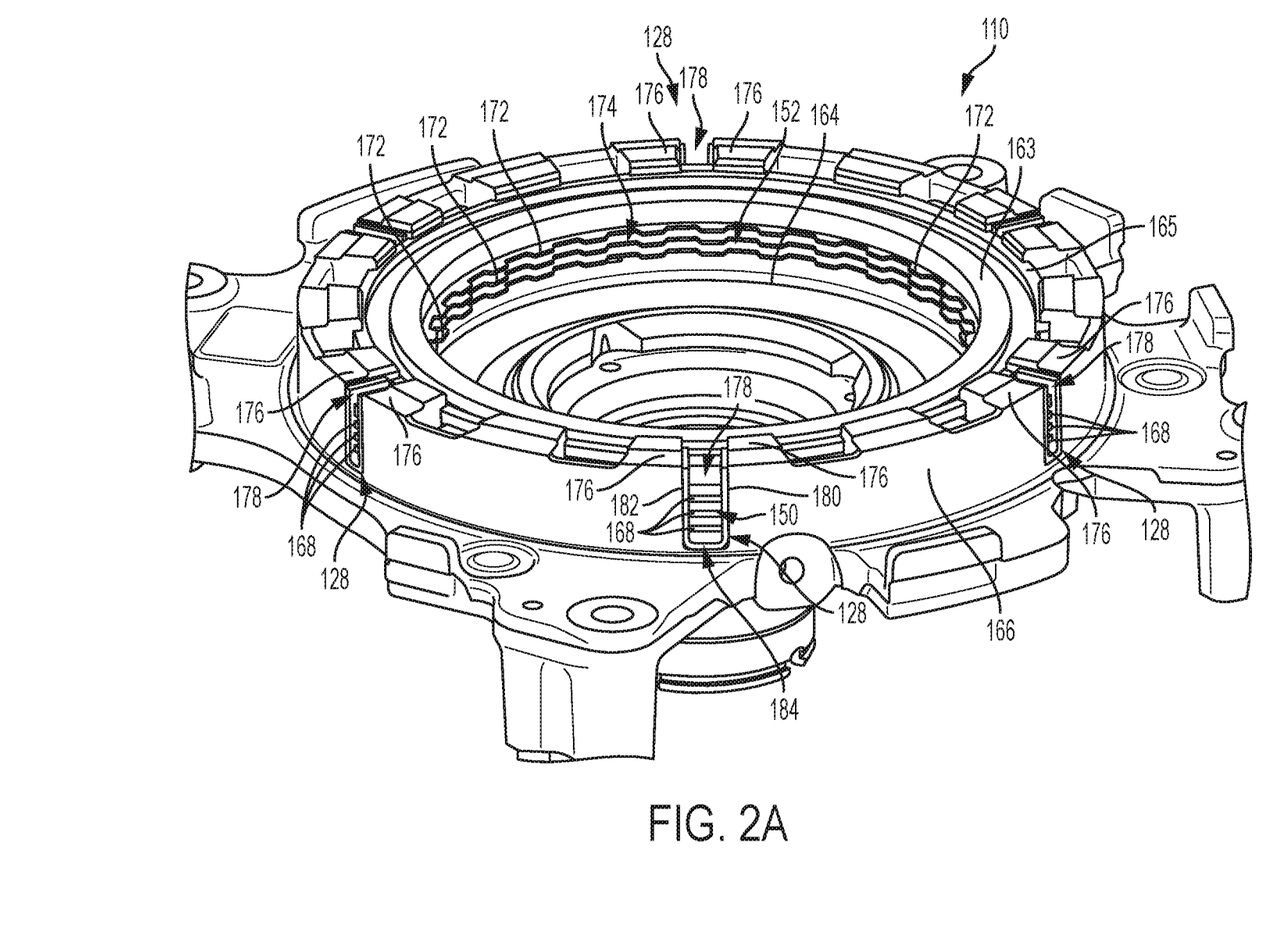
FIG. 2A is a perspective view of a portion of another motor vehicle transmission assembly, including another dampening component, in accordance with the principles of the present disclosure.
Figure 2B:
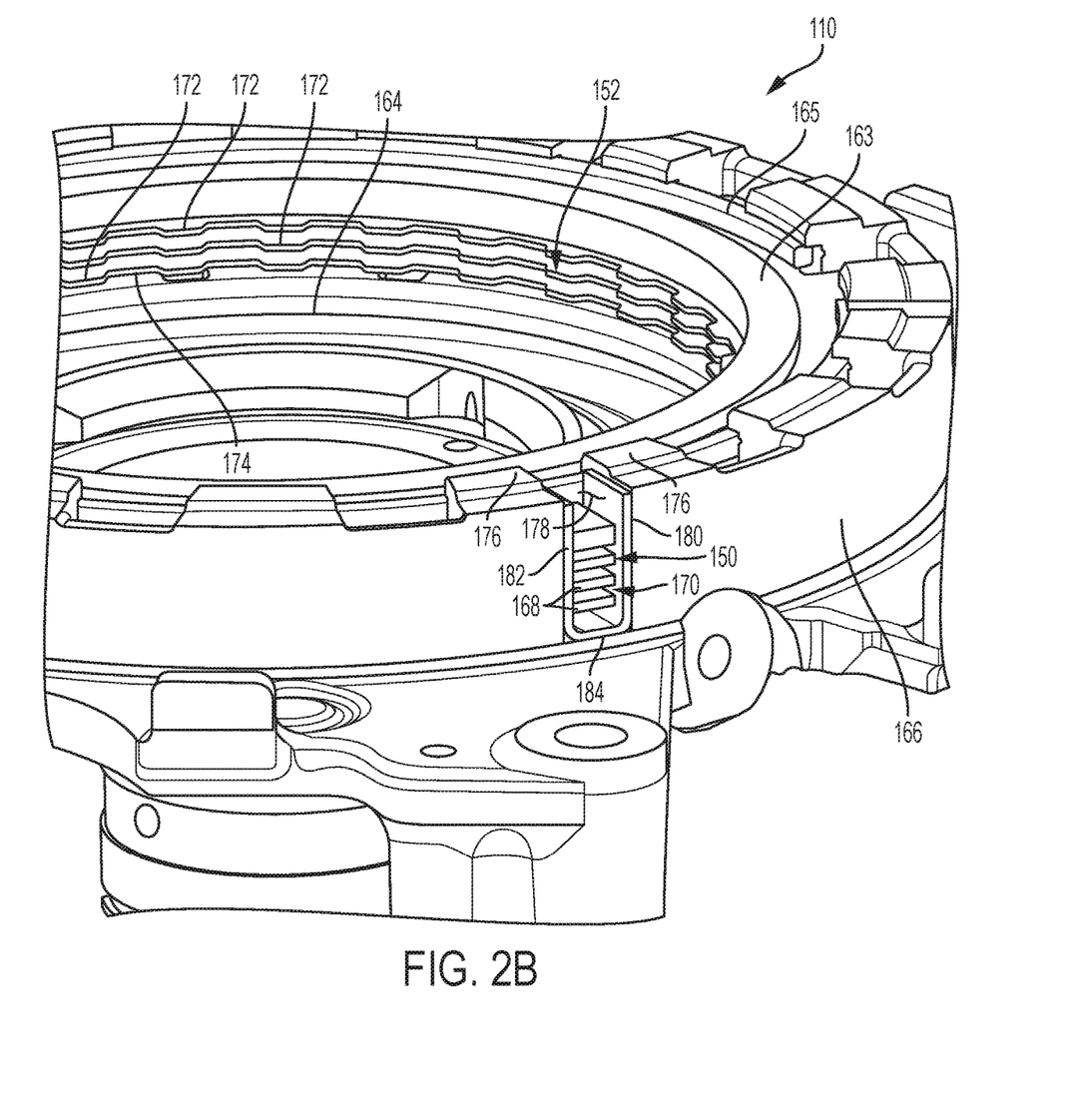
FIG. 2B is a perspective view of a portion of the motor vehicle transmission assembly shown in FIG. 2A, in accordance with the principles of the present disclosure.
Figure 2C:
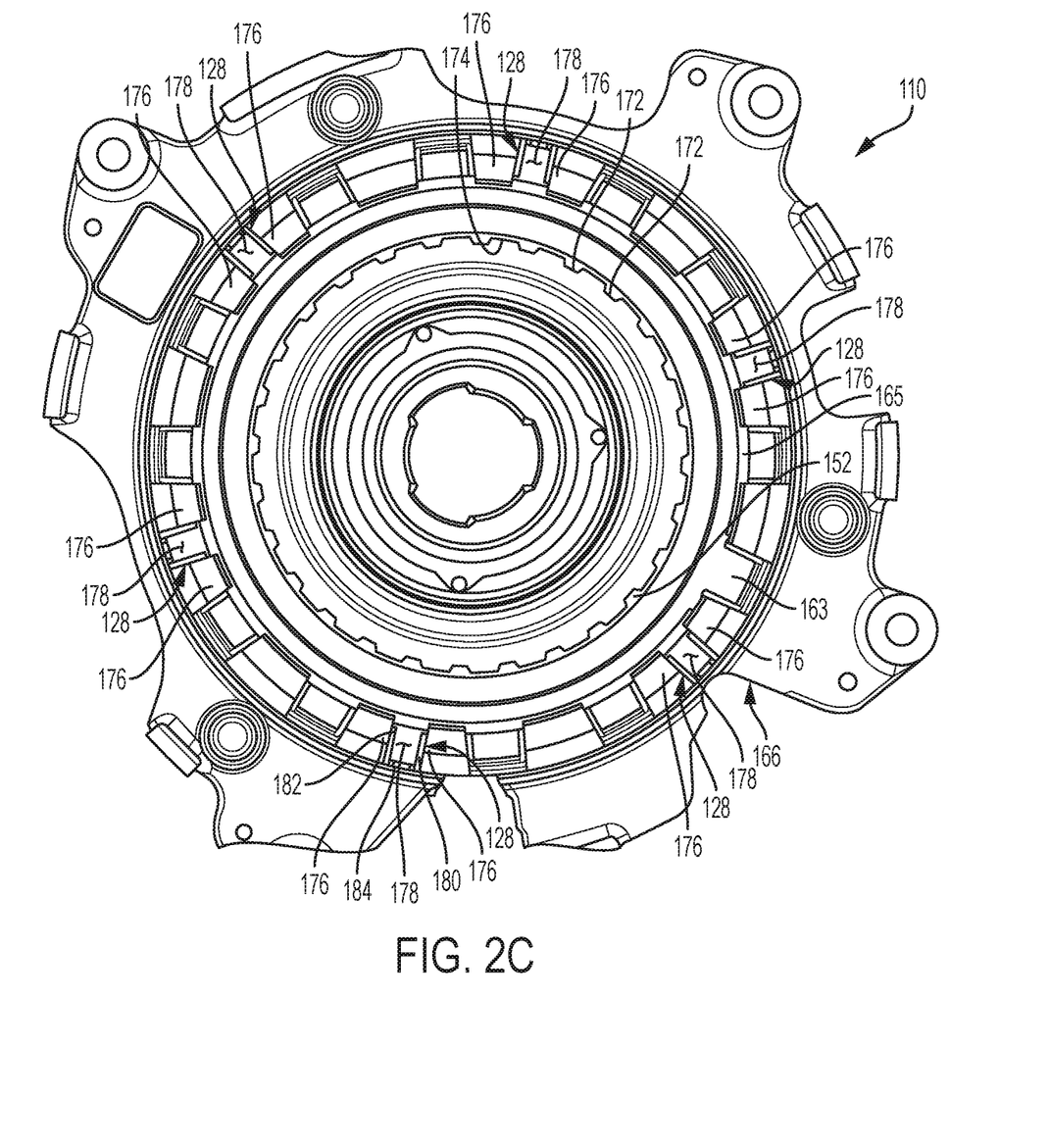
FIG. 2C is a plan view of a portion of the motor vehicle transmission assembly shown in FIGS. 2A-2B, according to the principles of the present disclosure.

Referring now to FIGS. 2A-2C, another variation of a transmission assembly within the scope of the present disclosure is illustrated and generally designated at 110. It should be understood that some of the components of the transmission assembly 110 are similar to or the same as the components described above with respect to the transmission assembly 10, and any description regarding the transmission assembly 10 above could be applied to the transmission assembly 110, if desired.

The transmission assembly 110 is a clutch assembly, or torque transmitting assembly, similar to the assembly 10 containing clutch plates 50, 52, apply plate 64, reaction plate 63, piston 62, and snap ring 65 described above. Accordingly, the transmission assembly 110 may have similar components, such as interleaved sets of friction clutch plates 150, 152, an apply plate 164, a reaction plate 163, a snap ring 165, and a piston or other actuator (not shown).

The torque transmitting assembly 110 includes a clutch housing 166 configured to surround and house the clutch plates 150, 152, the apply plate 164, the reaction plate 163, and the snap ring 165. Each clutch plate 150 of the first set of interleaved clutch plates 150, 152 has a plurality of teeth 168 disposed along an outer edge 170 of each clutch plate 150 of the first set of interleaved clutch plates 150, 152.

Each clutch plate 152 of the second set of interleaved clutch plates 150, 152 has a plurality of teeth 172 disposed along an inner edge 174 of each clutch plate 152. The teeth 172 are splined to an inner member (not shown), such as a clutch hub. One example of a clutch hub (not shown) to which the teeth 172 are splined is the clutch hub 30 shown in FIG. 1A.

The teeth 168 of the clutch plates 150 that make up the first set of interleaved clutch plates 150, 152 are splined to the clutch housing 166. As such, the clutch housing 166 includes a plurality of body portions 176 that define a plurality of recesses, or torque splines 178, in the clutch housing 166. The torque splines 178, or recesses, are configured to receive the plurality of teeth 168 of the clutch plates 150.

In this example, a dampening component 128 is disposed in each torque spline 178, or recess, of the clutch housing 166. Each dampening component 128 is an insert disposed in a torque spline 178. Each insert (dampening component 128) may comprise opposed, parallel first and second flat surfaces 180, 182 connected by a third flat surface 184 that is perpendicular to the first and second flat surfaces 180, 182. Thus, the dampening component 128 may have a U-shape. The dampening component 128 may be press fit into each torque spline 178, and/or the dampening component 128 may be attached to the clutch housing 166 by glue, welding, or any suitable fastener or fixing means.

In the illustrated example, six torque splines 178 are included in the clutch housing 166, and therefore six corresponding dampening components 128 are located about the circular clutch housing 166 within the torque splines 178. It should be understood, however, that any desirable number of torque splines 178 could be used and have dampening components 128 located therein.

Accordingly, each of the dampening components 128 abuts the clutch teeth 178 and dampens noise originating from the clacking of the clutch teeth 178 against the clutch housing 166 when the clutch plates 150, 152 are engaged or disengaged from each other. In this case, the teeth 178 will contact the dampening components 128 rather than the body portions 176 of the clutch housing 166 itself, and therefore, sound will be minimized by contact of teeth 178 against the dampening components 128.

In addition, although the dampening components 128 are illustrated as being located in the clutch housing 166, the dampening components 128 could alternative be located on a clutch hub (not shown) to which the inner clutch teeth 172 are splined, such as the clutch hub 30 described above.

The dampening components 128 could be formed of any suitable material configured to dampen noise or vibration within or surrounding the clutch assembly 110. For example, the dampening components 128 could be formed similarly to the dampening component 28 described above and shown in FIGS. 1D and 1E, having a plurality of metal outer layers sandwiching an inner polymer layer. As torque is transferred between the clutch plates 150 and the clutch housing 166, torque is transferred through the dampening components 128 located between the clutch plates 150 and the clutch housing 166.

Figure 3A:
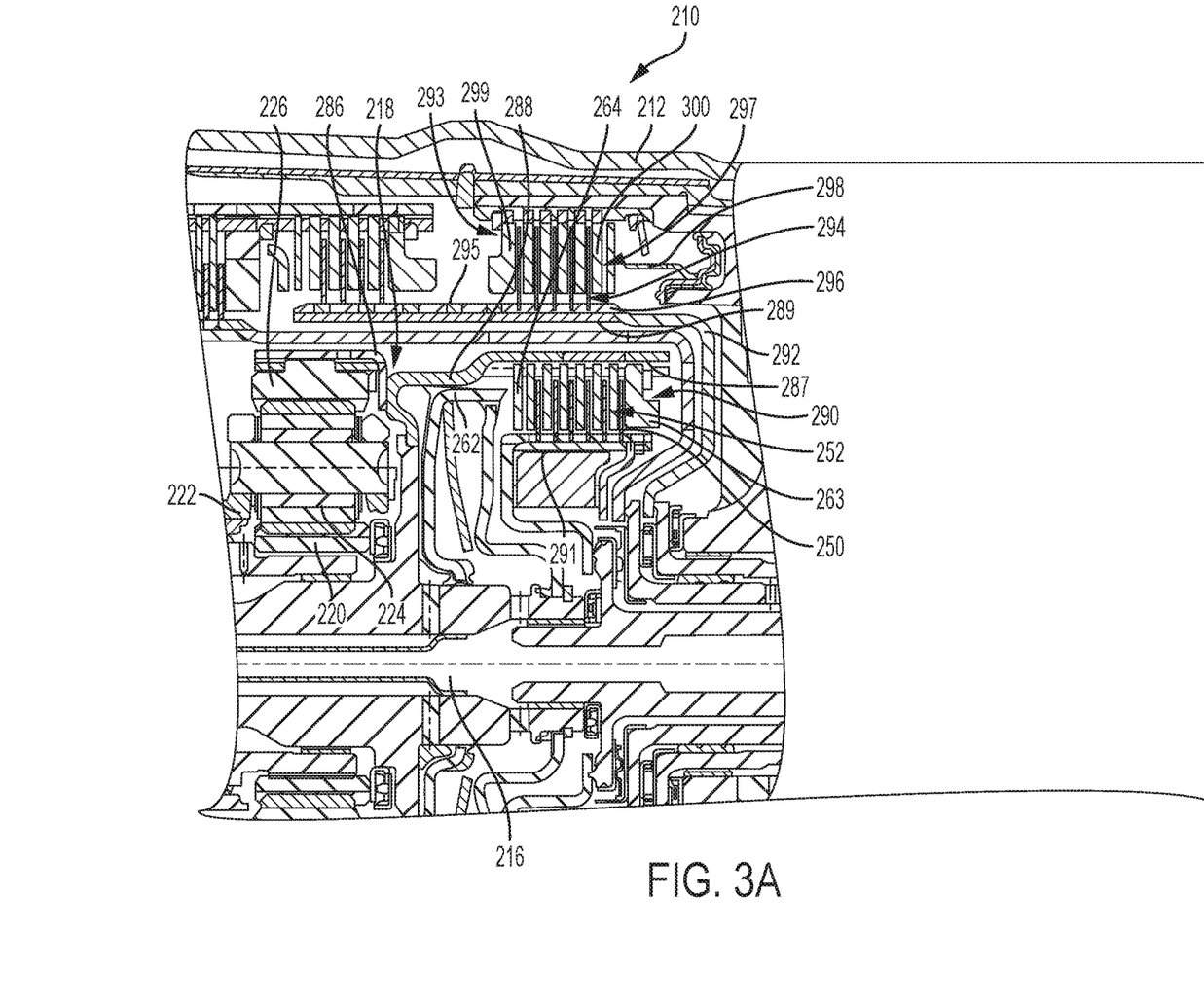
FIG. 3A is a cut-away cross sectional view of a portion of yet another motor vehicle transmission assembly, including yet another dampening component, in accordance with the principles of the present disclosure.
Figure 3B:
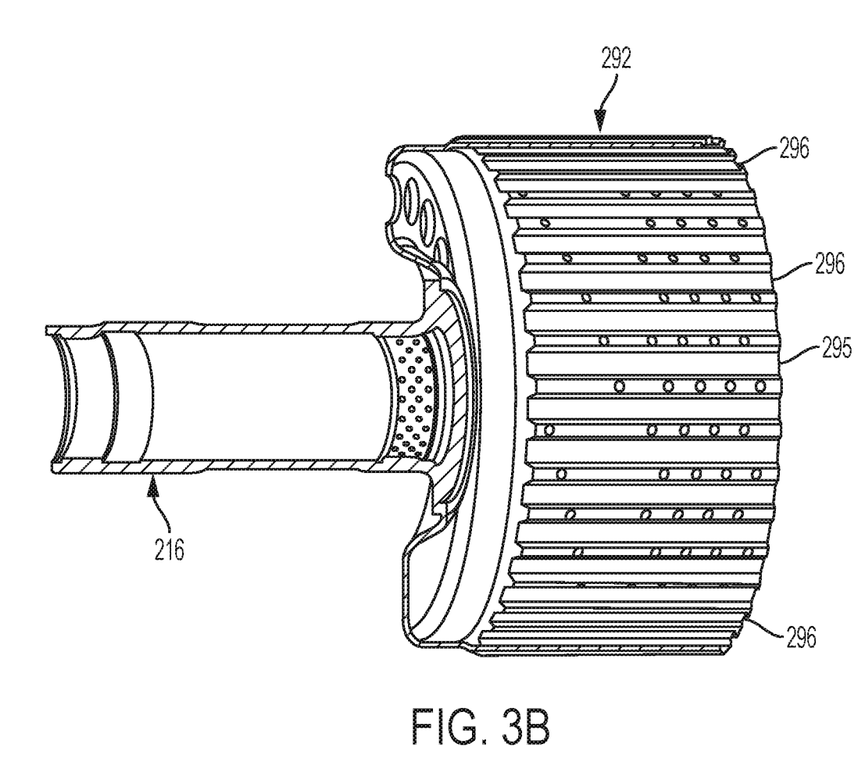
FIG. 3B is a cross-sectional view of a portion of the motor vehicle transmission assembly of FIG. 3A, including the dampening component, according to the principles of the present disclosure.

Referring now to FIGS. 3A-3B, yet another variation of a transmission assembly within the scope of the present disclosure is illustrated and generally designated at 210. It should be understood that some of the components of the transmission assembly 210 are similar to or the same as the components described above with respect to the transmission assembly 10 or 110, and any description regarding the transmission assemblies 10 or 110 above could be applied to the transmission assembly 210, if desired.

The transmission assembly 210 includes a metal transmission case 212, which mounts, positions, and protects various components, such as a rotatable shaft 216, a planetary gear assembly 218, and various other components.

In this example, the planetary gear assembly 218 includes a sun gear 220, a planetary gear carrier 222 including a plurality, typically three or four, of planetary gears 224, and a ring gear 226. The sun gear 220 meshes with the planetary gears 224 that are concentrically disposed about the sun gear 220, and the planetary gears 224 mesh with the ring gear 226 that is concentrically disposed about the planetary gears 224 and the sun gear 220. Each of the sun gear 220, the planetary carrier 222, and the ring gear 226 may be selectively or fixedly connected to other gears, carriers, or stationary components within the transmission assembly 210 to transfer torque therethrough.

In the illustrated example, the ring gear 226 is mounted to a support or hub 286, which is fixed to another support or housing 288 that is connected to a clutch assembly 290. The clutch assembly 290 is configured to selectively connect the ring gear 226 to other components within the transmission assembly 210.

Accordingly, a plurality of first inner clutch plates 250 are splined to an inner member 291. The plurality of first inner clutch plates 250 are interleaved with a plurality of second inner clutch plates 252, which are splined to an inner surface 287 of the housing 288. The housing 288 is then further connected within the transmission assembly 210 to other components.

A clutch housing 292 is concentrically disposed around the clutch plurality of interleaved clutch plates 250, 252 making up the clutch assembly 290. Though the clutch plates 252 are splined to the housing 288, it should be understood that in other configurations, the clutch plates 252 could be splined directly to an inner surface 289 of a clutch housing 292.

The inner clutch plates 250, 252 are interleaved such that each inner clutch plate 250 of the first set is disposed adjacent to an inner clutch plate 252 of the second set. When compressed together, the inner clutch plates 250, 252 rotationally lock together and transfer torque through the inner member 291 and the housing 288 (in the illustrated example).

The inner clutch plates 250, 252 may be friction clutch plates that are selectively engaged by a piston 262 or other actuator that is configured to compress the first and second sets 250, 252 of inner clutch plates together against a backing plate 263 through one or more apply plates 264. For example, friction facing material may be disposed on opposing faces of the inner clutch plates 250, 252. In the alternative, other types of clutches and/or brakes such as drums or dog clutches could be used. Thus, the plurality of interleaved inner clutch plates 250, 252 are configured to selectively transfer torque within the transmission assembly 10, within the clutch housing 292.

In addition to serving as a housing for the clutch assembly 290 and the planetary gear assembly 218, the clutch housing 292 is also a clutch hub for a second clutch assembly 293. The second clutch assembly 293 is configured to selectively connect the clutch housing 292 to the case 212, in this example. It should be understood, however, that the clutch housing 292 may alternatively be selectively or permanently connected to other components within the transmission assembly, if desired.

A plurality of first outer clutch plates 294 are splined to an outer surface 295 of the clutch housing 292, via spline recesses 296. The plurality of first outer clutch plates 294 are interleaved with a plurality of second outer clutch plates 297, which are splined to the transmission case 212, or to a component connected to the transmission case 212. In other embodiments, the second outer clutch plates 297 could be splined to another component that is not connected to the transmission case 12.

The outer clutch plates 294, 297 are interleaved such that each outer clutch plate 294 of the first set is disposed adjacent to an outer clutch plate 297 of the second set. When compressed together, the outer clutch plates 294, 297 rotationally lock together and transfer torque through the clutch housing 292 and the transmission case 212.

The outer clutch plates 294, 297 may be friction clutch plates that are selectively engaged by a piston 298 or other actuator that is configured to compress the first and second sets of outer clutch plates 294, 297 together against a backing plate 299 through one or more apply plates 300. For example, friction facing material may be disposed on opposing faces of the outer clutch plates 294, 297. As hereinbefore described, in the alternative, other types of clutches and/or brakes such as drums or dog clutches could be used.

The clutch housing 292 is comprised of a dampening material configured to reduce noise and/or vibration created by any of the various gears 220, 224, 226 in the planetary gear assembly 218, the pluralities of interleaved clutch plates 250, 252, 294, 297, or any other component within the transmission assembly 210. Thus, other transmission components can be formed of materials that are traditionally not considered to be a sound dampening material, such as aluminum or steel, because the dampening material of the clutch housing 292 will absorb at least some of the sound created by aluminum or steel components.

The dampening material making up the clutch housing 292 could have any configuration and arrangement that is sufficient to reduce at least one of noise and vibration with the transmission assembly 210. For example, the clutch housing 292 could be formed similarly to the dampening component 28 described above and shown in FIGS. 1D and 1E, having a plurality of metal outer layers disposed around an inner polymer layer.

In an example where the clutch housing 292 is splined to the clutch plates 252, the ring gear 226 would be capable of being rotationally interlocked by the clutch assembly 290, and would be torque transferrable between the ring gear and the clutch housing 292. When the clutch housing 292 and the transmission case 212 are rotationally interlocked by the clutch assembly 293, torque is transferred therebetween. The dampening material of the clutch housing 292 is thus also able to transfer torque between any component permanently or selectively connected to the housing 292, to the clutch plates 294 and the case 212. In other words, the transmission assembly 210 is configured to transfer torque between components connected to the clutch housing 292 and the case 212 and the clutch assembly 293, through the clutch housing 292.

Figure 4:
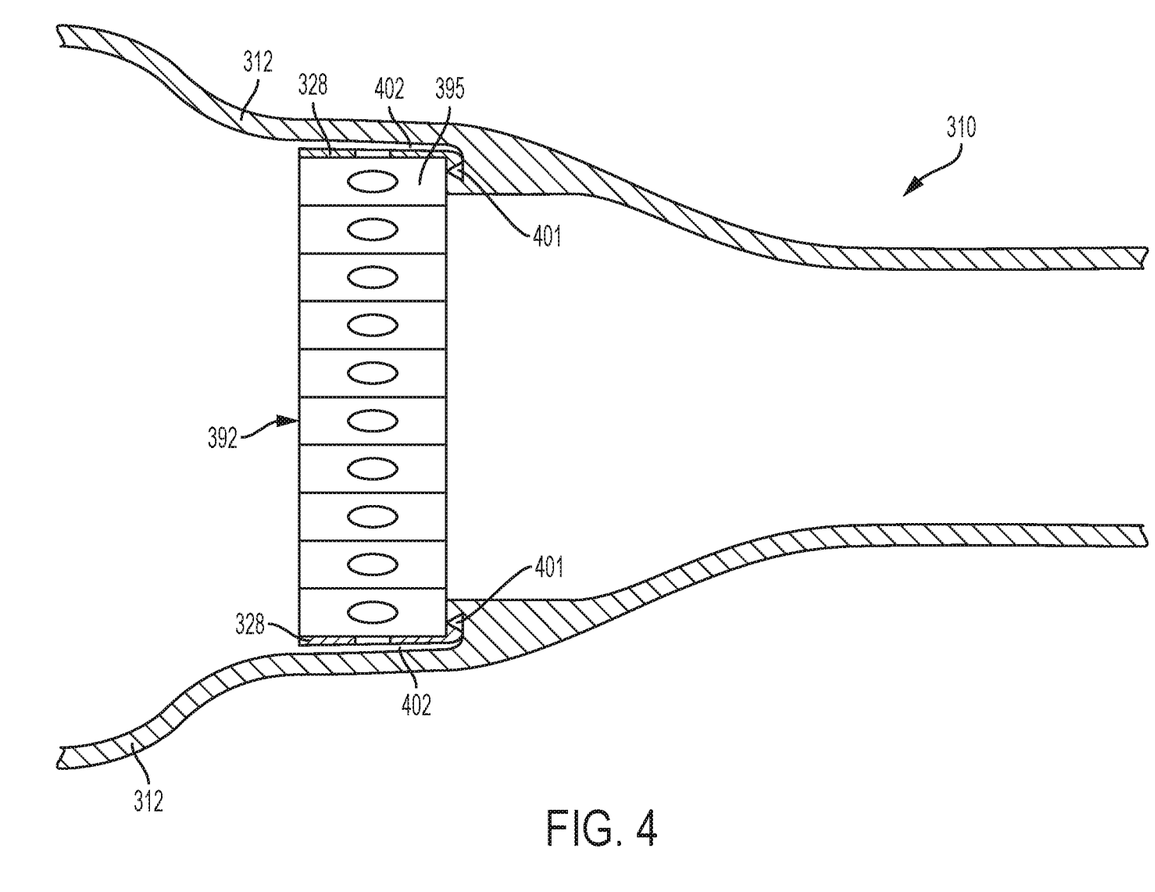
FIG. 4 is a schematic cut-away side view of a portion of still another motor vehicle transmission assembly, including still another dampening component, in accordance with the principles of the present disclosure.

Referring now to FIG. 4, still another variation of a transmission assembly within the scope of the present disclosure is illustrated and generally designated at 310. It should be understood that some of the components of the transmission assembly 310 are similar to or the same as the components described above with respect to the transmission assembly 10, 110, or 210, and any description regarding the transmission assemblies 10, 110, 210 above could be applied to the transmission assembly 310, if desired.

The transmission assembly 310 includes a metal transmission case 312, which mounts, positions, and protects various components, such as a clutch housing 392, shafts (not shown), planetary gear assemblies (not shown), and various other components.

Like the clutch housing 292 described above, the clutch housing 392 may house one or more planetary gear assemblies and clutch assemblies (not shown). Like the clutch housing 292 described above, the clutch housing 392 may be comprised of a dampening material configured to reduce noise and/or vibration created by any of the various gears, clutch assemblies, or any other component within the transmission assembly 310. Thus, other transmission components can be formed of materials that are traditionally not considered to be a sound dampening material, such as aluminum or steel.

Additionally, or in the alternative, a dampening component 328 may surround the clutch housing 392. The dampening component 328 may be similar to the dampening component 28 shown in FIGS. 1A-1E, wherein the dampening component 328 may be splined to an outer surface 395 of the clutch housing 392, and the dampening 328 may be a stamped insert like the dampening component 28 of FIGS. 1A-1E.

Dampening material making up the clutch housing 392 and/or the dampening component 328 could have any configuration and arrangement that is sufficient to reduce at least one of noise and vibration with the transmission assembly 310. For example, the clutch housing 392 and/or the dampening component 328 could be formed similarly to the dampening component 28 described above and shown in FIGS. 1D and 1E, having a plurality of metal outer layers disposed around an inner polymer layer.

The clutch housing 392 and the dampening component 328 are coupled to the transmission case 312, in this example. For example, the clutch housing 392 and/or the dampening component 328 may be joined to the case 312 through weld joints 401, which could be formed through friction welding or laser welding, or the dampening component 328 and/or clutch housing 392 may be splined to the case 312. Oil flow paths 402 may be provided between the clutch housing 392 and the case 312, or between the dampening component 328 and the case 312, if desired. As the clutch housing 392 is rotationally interlocked to the case 312, torque is transferred therebetween, which may be through the dampening component 328.

In addition to absorbing noise and/or vibration within the transmission assemblies 10, 110, 210, 310, the dampening components 28, 128, 292, 392, 328 may also allow for looser spline tolerances, since backlash will no longer create as much discernable noise and/or vibration.

While the above examples are described individually, it will be understood by one of skill in the art having the benefit of this disclosure that amounts of elements described herein may be mixed and matched from the various examples within the scope of the appended claims.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

I claim:

1. A motor vehicle transmission assembly comprising:
   a first transmission component;
   a second transmission component, the second transmission component being one of a clutch hub, a clutch housing, a gear, a case, a support, and a shaft;
   a dampening component disposed between the first and second transmission components, the dampening component being configured to reduce at least one of noise and vibration within the transmission assembly, the dampening component contacting the first transmission component and the second transmission component, the dampening component comprising a metallic portion and a non-metallic portion, the transmission assembly being configured to transfer torque between the first and second transmission components through the dampening component, the dampening component being arranged as at least one of the following: A) the dampening component abutting the second transmission component and B) the dampening component being fixed to the second transmission component; and
   a plurality of interleaved clutch plates configured to selectively transfer torque within the transmission assembly, the dampening component being configured to reduce noise created by the plurality of interleaved clutch plates.

2. The motor vehicle transmission assembly of claim 1, wherein the metallic portion of the dampening component comprises a pair of metal layers, and the non-metallic portion comprises a polymer, the polymer being disposed between the pair of metal layers, the polymer contacting each metal layer of the pair of metal layers.

3. The motor vehicle transmission assembly of claim 2, wherein each of the metal layers of the pair of metal layers comprises at least one of aluminum and steel, and wherein the pair of metal layers comprises a first metal layer contacting the first transmission component and a second metal layer contacting the second transmission component, the polymer being free from direct contact with the first transmission component and the second transmission component.

4. The motor vehicle transmission assembly of claim 1, wherein the first and second transmission components are substantially formed of at least one of aluminum and steel.

5. The motor vehicle transmission assembly of claim 1, wherein the dampening component is a stamped insert abutting and sandwiched between the second transmission component and the first transmission component.

6. The motor vehicle transmission assembly of claim 5, wherein the first transmission component comprises portions forming a plurality of first splines, the second transmission component comprising portions forming a plurality of second splines, the pluralities of first and second splines being complimentary and configured to mate with each other and transfer torque therethrough.

7. The motor vehicle transmission assembly of claim 6, the dampening component being disposed between the pluralities of first and second splines.

8. The motor vehicle transmission assembly of claim 7, wherein the first transmission component is a ring gear and the second transmission component is a clutch hub, a portion of the interleaved clutch plates being splined to the clutch hub.

9. The motor vehicle transmission assembly of claim 1, wherein the first transmission component is a clutch plate having a plurality of teeth extending therefrom, the second transmission component forming a plurality of torque splines configured to receive the plurality of teeth of the clutch plate, the dampening component being an insert disposed in a torque spline of the plurality of torque splines.

10. The motor vehicle transmission assembly of claim 9, wherein the dampening component is a first dampening component, the assembly further comprising a plurality of additional dampening components, each additional dampening component being disposed in a torque spline of the plurality of torque splines.

11. The motor vehicle transmission assembly of claim 1, wherein the dampening component is at least one of a clutch hub and a clutch housing.

12. The motor vehicle transmission assembly of claim 1, the second component being a transmission case, the dampening component being coupled to the transmission case.

13. A torque transmitting assembly for use in an automotive transmission, the torque transmitting assembly comprising:
a plurality of interleaved clutch plates configured to selectively transfer torque;
a dampening component detached from the plurality of interleaved clutch plates, the dampening component configured to reduce at least one of noise and vibration created by the plurality of interleaved clutch plates, the dampening component comprising a dampening layer disposed between a pair of outer layers, and wherein an outer layer of the pair of outer layers contacts each of a first transmission component and a second transmission component, the dampening layer being free from direct contact with the first and second transmission components.

14. The torque transmitting assembly of claim 13, wherein the dampening layer comprises a polymer, and the pair of outer layers are formed of metal.

15. The torque transmitting assembly of claim 14, the dampening component being configured to transfer torque.

16. The torque transmitting assembly of claim 15, the dampening component being configured to transfer torque between the first and second transmission components, the dampening component being a stamped insert abutting and sandwiched between the second transmission component and the first transmission component.

17. The torque transmitting assembly of claim 15, a clutch plate of the plurality of interleaved clutch plates having a plurality of teeth extending therefrom, the torque transmitting assembly further comprising a member defining a plurality of torque splines configured to receive the plurality of teeth of the clutch plate, the dampening component being an insert disposed in a torque spline of the plurality of torque splines.

18. The torque transmitting assembly of claim 15, wherein the dampening component is at least one of a clutch hub and a clutch housing.

* * * * *